July 11, 1967 A. BRAND ETAL 3,330,461
CAPSTAN
Filed May 14, 1965
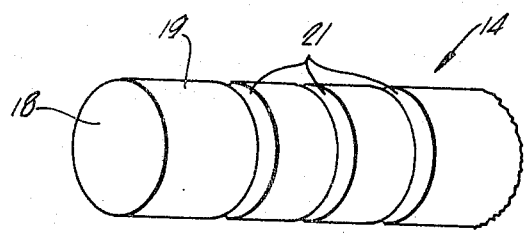
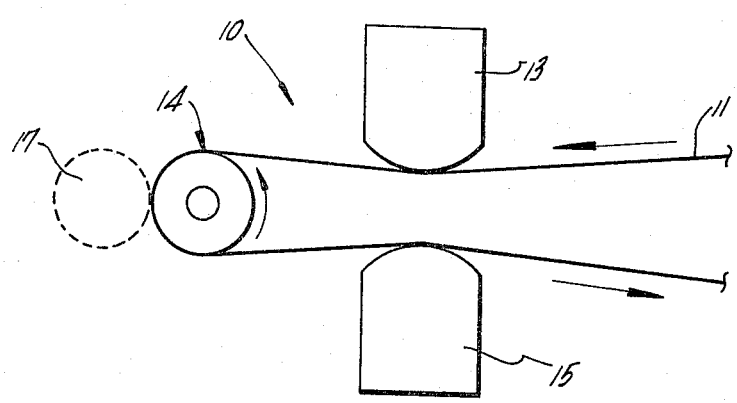
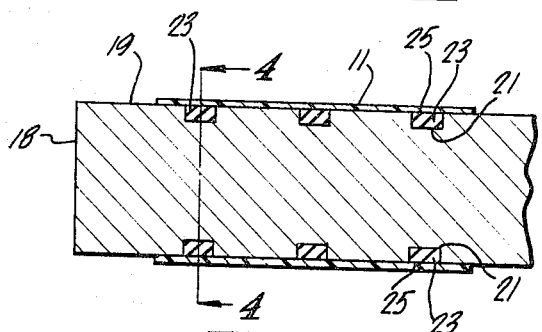 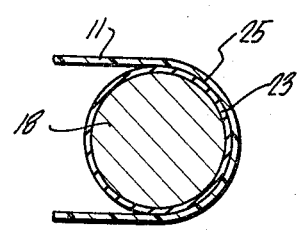
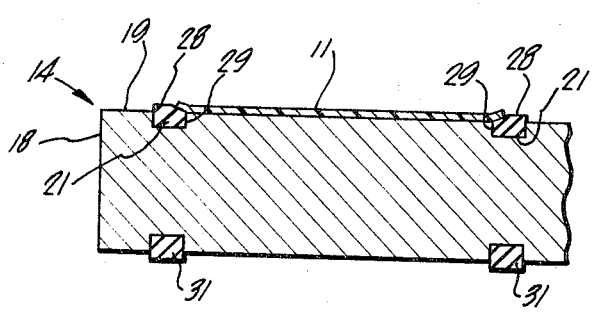 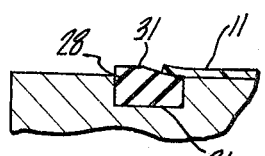
INVENTORS.
ABRAHAM BRAND
JOHANNES B. GROENEWEGEN
BY
Christie, Parker & Hale
ATTORNEYS.

3,330,461
CAPSTAN
Abraham Brand, Van Nuys, and Johannes B. Groenewegen, San Dimas, Calif., assignors to Consolidated Electrodynamics Corporation, Pasadena, Calif., a corporation of California
Filed May 14, 1965, Ser. No. 455,744
2 Claims. (Cl. 226—193)

This invention relates to an improved capstan for use in mechanisms transporting strip materials.

In the field of recording instruments, there is often a requirement for high-accuracy transport of strip material. For example, a magnetic tape recorder must move magnetic tape across recording or playback heads at a constant, precisely controlled speed. Similarly, a recording oscillograph must provide means for transporting a strip of recording medium such as photographic paper or film across an area of photographic exposure at a uniform rate. Other types of recorders using inking pens or heat-sensitive papers may pose a similar requirement.

A common approach in the design of such transport mechanisms is to control the speed of the strip material with a capstan-drive system. A capstan or round shaft of known diameter is rotated, often through a system of belts and pulleys, by a drive motor. A flywheel is commonly secured to the capstan to achieve uniform rotational velocity and freedom from transient disturbances. The strip material to be transported is then frictionally coupled to the capstan, the strip material thereby being moved by the capstan at a uniform rate. Suitable tensioning means are provided to keep the strip material taut between the capstan and a supply reel and takeup reel.

The ideal capstan is a simple round shaft. The shaft is machined to a precise diameter which determines, for any given rotational speed of the capstan, the linear speed of the strip material driven by the capstan. It can be shown that the point at which slippage or de-coupling of the strip material will occur is determined by the following equation:

$$\frac{T_1}{T_2} = e^{f\alpha}$$

in which
$T_1$ is the strip-material tension on the supply side,
$T_2$ is the strip-material tension on the takeup side,
$f$ is the coefficient of friction between the strip material and the capstan surface,
$\alpha$ is the "wrap angle" over which the strip material contacts the capstan, and
$e$ is the base of natural logarithms In an actual transport mechanism, slippage will often occur for practical values of $T_1$, $T_2$ and $\alpha$, because the coefficient of friction between the strip material and the smooth metal capstan is quite low. It is not practical to increase the coefficient of friction by constructing a substantial portion of the capstan from a material such as rubber because such materials tend to deform under pressure from the strip material. Deformation cannot be tolerated in a precision drive system because it induces skew and inaccuracy in the average and instantaneous linear speed of the strip material. Some auxiliary means for coupling the strip material to the capstan must therefore be provided.

In capstan-drive systems used in the past, it has been common to provide one or more pinch rollers to insure that the strip material is adequately coupled to the capstan. A pinch roller is a free-running roller positioned adjacent the capstan and pressed against the strip material as it passes over the capstan. The strip material is thereby coupled to the capstan, and the pinch roller rotates freely as the strip material passes between the pinch roller and the capstan.

Unfortunately, the pinch rollers themselves must be of extremely precise construction if the introduction of flutter and skewing of the strip material is to be avoided. Such pinch rollers are expensive to manufacture, difficult to align, and require relatively frequent maintenance and replacement if accurate transport is to be achieved. Even when properly aligned, the addition of another rotating element and its associated bearings in a strip-material transport system invariably results in the introduction of some irregularity or flutter in the motion of the strip material.

The capstan of this invention overcomes the above disadvantages by providing the necessary coupling between the capstan and strip material, and at the same time eliminating the need for pinch rollers. The invention permits the construction of a simple, highly precise transport system with a minimum number of rotating elements. Use of the improved capstan results in lower manufacturing cost, lower maintenance expense, more dependable operation, and lower overall flutter.

Briefly stated, the capstan of this invention comprises a round elongated shaft having at least one annular groove. The plane of the groove is perpendicular to the axis of the shaft. A ring is secured in the groove. The outer surface of the ring extends substantially across the groove width and is substantially flush with the shaft surface. The ring is formed from a material which, in combination with the strip material to be transported, has a higher coefficient of friction than that of the strip material and the shaft surface.

The effect of the ring is to raise the average coefficient of friction between the strip material and the capstan to a point where slippage no longer occurs at normally used tensions and wrap angles. The desired rigidity and stability of a metal capstan is retained, and satisfactory coupling is achieved without pinch rollers.

The improved capstan is of course also useful in a transport system employing pinch rollers where it is desirable to reduce the force with which the pinch rollers bear against the strip material. For example, excessive pressure at the contact area of a pinch roller and photographic paper or film can affect the photographic emulsion and result in undesired streaks in the developed photographic record. Use of the improved capstan permits lower pinch-roller forces, eliminating streaks in the finished record, while still maintaining good coupling between the capstan and strip material.

These and other aspects of the invention will be explained by reference to the drawings in which:
FIG. 1 is a schematic daigram of a portion of a magnetic-tape transport;
FIG. 2 is a fragmentary perspective view of a portion of the improved capstan;
FIG. 3 is a fragmentary elevation of the improved capstan;
FIG. 4 is a view taken on line 4—4 of FIG. 3;
FIG. 5 is a fragmentary elevation of an alternative embodiment of the improved capstan; and
FIG. 6 is an enlarged view of a portion of FIG. 5.

Referring to FIG. 1, an improved capstan is shown as incorporated in a magnetic-tape transport system 10. Such a system typically includes supply and takeup reels (not shown) and means (not shown) for winding the tape on the takeup reel and tensioning the tape so it is taut between the reels. Magnetic tape 11 is drawn from the supply reel to pass over a magnetic recording head 13, a capstan 14, and a magnetic reproducing head 15. This configuration is by way of illustration only, and the capstan can also function properly when, for example, only a single head is used, or when more than two heads are used.

Capstan 14 is rotated by a motor or other drive system (not shown) such that its surface speed equals the desired linear speed of the tape which may range from a fraction of one inch per second to over 100 inches per second. The capstan is very precisely machined to a low-runout-tolerance diameter such that a given rate of rotation will produce a precisely known surface speed without introducing flutter or other irregularities in the tape motion.

In order that the capstan surface and the tape move together as a unit without slippage over their area of contact, it is necessary to provide means coupling the tape to the capstan. This can be accomplished by a pinch roller 17 (as shown in phantom in FIG. 1) which forces the tape against the capstan, but such systems suffer from the drawbacks already discussed. Use of the capstan 14 of this invention provides adequate tape coupling without pinch rollers by raising the average coefficient of friction between the tape and capstan.

Referring to FIGS. 2, 3 and 4, capstan 14 comprises a round shaft 18 with a smoothly ground outer surface 19. In a magnetic-tape transport, the capstan would normally be made from a nonmagnetic metal such as aluminum. Machined into the capstan are a series of annular grooves 21. The cross section of these grooves is not critical, and can be rounded as suggested in FIG. 2, or square as shown in FIG. 3.

Disposed in each groove 21 is an annular ring 23 of a material, which in combination with the tape, has a higher coefficient of friction than the combination of surface 19 and the tape. An elastomeric material such as rubber is suitable for the ring and permits simple, inexpensive assembly. Elastic O-rings are readily available and can be rolled over surface 19 to snap into a groove 21 to be cemented or otherwise secured into place. An outer surface 25 of the ring is cut or ground flat to a diameter substantially equal to the diameter of capstan shaft 18.

As best seen in FIG. 3, the taut tape passes over the capstan to contact metal surface 19 which establishes a precise speed. The tape also contacts outer surface 25 on each ring 23 and is thereby coupled to the capstan without slippage. An elastomeric material such as rubber is sufficiently compliant that any slight irregularities in surface 25 will flatten out under the pressure of the tensioned tape.

While three annular rings have been shown on the capstan pictured in FIGS. 2, 3 and 4, this is by way of example only, and capstans can be constructed according to the invention which incorporate one, two, or more rings. The necessary number of rings for any particular transport system depends on the frictional coefficients and tape tensions used in the system.

An alternative form of the invention is shown in FIGS. 5 and 6 in which capstan 14 is generally similar to the embodiment just described except that an annular groove 21 is located at each edge of tape 11. Facing edges 29 of the two grooves are spaced apart a distance equal to the tape width less approximately 0.003 inch.

An annular ring 28 of an elastomeric material such as rubber is secured in the groove. Outer surface 31 of each ring is cut or ground to a diameter slightly larger than the diameter of capstan shaft 18. We have found that rings which extend approximately 0.003 inch above capstan surface 19 produce satisfactory results. This construction is best seen at the bottom of FIG. 5 where the ring cross-section is shown as it appears before tape is wrapped around the capstan.

When tensioned tape 11 is wrapped around the capstan, the projecting elastomeric rings 28 are smoothly deformed into the cross-sectional shape seen at the top of FIG. 5 and in FIG. 6. The edges of the tape are slightly distorted by this style of ring, but this is not serious where recorded data on the tape is confined to tracks spaced apart from the tape edges.

There has been described an improved capstan for use in precision transport mechanisms for strip materials. While the invention has been discussed in terms of its use in a magnetic-tape transport mechanism, it is not limited to this use. The invention has utility in many types of strip-material transports where the need for precisely controlled uniform motion of the strip material makes desirable the reduction of pinch-roller forces or the complete elimination of pinch rollers.

What is claimed is:

1. In a magnetic-tape transport mechanism, a capstan for controlling speed of the magnetic tape and providing coupling to the tape without the use of a pinch roller, the capstan comprising a round, elongated shaft having two annular grooves, the major planes of the grooves being perpendicular to the shaft axis, the grooves being disposed on opposite sides of and equal distances from the longitudinal center line of tape passing around the capstan, the inner edges of the two grooves being spaced apart a distance equal to the tape width minus approximately 0.003 inch, and the outer edges of the grooves extending outwardly beyond the edges of the tape, and an elastomeric ring secured in each groove, the outer surface of the ring being approximately 0.001 inch to 0.003 inch above the shaft surface and extending substantially across the groove width, the ring surface and tape having a higher coefficient of friction than the shaft surface and tape, the tape being free of pinch-roller pressure as it passes around the capstan.

2. In a magnetic-tape transport mechanism, a capstan for controlling speed of the magnetic tape and providing coupling to the tape without the use of a pinch roller, the capstan comprising a round, elongated shaft having two annular grooves, the major planes of the grooves being perpendicular to the shaft axis, the grooves being disposed on opposite sides of and equal distances from the longitudinal center line of tape passing around the capstan, the inner edges of the two grooves being spaced apart a distance slightly less than the tape width and the outer edges of the grooves extending outwardly beyond the edges of the tape, and an elastomeric ring secured in each groove, the outer surface of each ring extending slightly above the shaft surface and extending substantially across the groove width, the ring surface and tape having a higher coefficient of friction than the shaft surface and tape, the tape being free of pinch-roller pressure as it passes around the capstan.

References Cited
UNITED STATES PATENTS

| | | | |
|---|---|---|---|
| 1,563,704 | 12/1925 | Greis | 226—193 X |
| 2,786,672 | 3/1957 | Humphner | 226—186 |
| 3,132,785 | 5/1964 | Kunz | 226—186 X |
| 3,240,442 | 3/1966 | Kilmartin | 226—193 X |

M. HENSON WOOD, JR., *Primary Examiner.*

ALLEN N. KNOWLES, *Examiner.*